US006504471B1

(12) United States Patent
Lam

(10) Patent No.: US 6,504,471 B1
(45) Date of Patent: Jan. 7, 2003

(54) TRANSDUCER APPARATUS RESPONSIVE TO EXTERNAL PERTURBATION

(76) Inventor: Peter Ar-Fu Lam, 20104 Wayne Ave., Torrance, CA (US) 90503

( * ) Notice: Subject to any disclaimer, the term of this patent is extended or adjusted under 35 U.S.C. 154(b) by 0 days.

(21) Appl. No.: 08/514,994

(22) Filed: Aug. 14, 1995

Related U.S. Application Data

(63) Continuation-in-part of application No. 08/405,584, filed on Mar. 17, 1995, now Pat. No. 5,473,307, which is a continuation-in-part of application No. 07/999,291, filed on Dec. 31, 1992, now Pat. No. 5,469,132.

(51) Int. Cl.[7] ............................ G10K 1/00; B60Q 1/00

(52) U.S. Cl. ............................ 340/392.1; 340/425.5; 340/429; 340/600; 340/693.1; 307/9.1; 40/424; 362/486

(58) Field of Search ............................ 340/467, 464, 340/429, 683, 392, 689, 691–693, 665, 566, 392.1, 392.4, 392.5, 395.1, 425.5, 426, 473, 321, 546, 547, 471, 472; 200/61.45 R, 61.52, 52 A; 362/253, 806, 486; 84/404, 464 R; 40/409, 485, 591, 593, 594, 600, 621, 424; 307/9.1, 10.1

(56) References Cited

U.S. PATENT DOCUMENTS

| | | | | | |
|---|---|---|---|---|---|
| 2,780,802 | A | * | 2/1957 | Propos | 340/321 |
| 3,192,517 | A | * | 6/1965 | Werlin | 340/546 |
| 4,833,454 | A | * | 5/1989 | Pawlik et al. | 340/693 |
| 4,841,288 | A | * | 6/1989 | Addicks | 340/693 |
| 4,842,235 | A | * | 6/1989 | Brown et al. | 248/452 |
| 4,926,573 | A | * | 5/1990 | Hetrick | 40/663 |
| 4,951,045 | A | * | 8/1990 | Knapp et al. | 340/691 |
| 5,252,947 | A | * | 10/1993 | Marciano | 340/692 |
| 5,266,920 | A | * | 11/1993 | Langner | 340/568 |
| 5,315,492 | A | * | 5/1994 | Davenport | 362/122 |
| 5,373,581 | A | * | 12/1994 | Smith | 392/390 |

FOREIGN PATENT DOCUMENTS

| | | | | |
|---|---|---|---|---|
| FR | 2639299 | * | 5/1990 | 340/425.5 |

* cited by examiner

*Primary Examiner*—Donnie L. Crosland

(57) ABSTRACT

Transducer apparatus (10) responsive to external perturbations is disclosed having an electrically responsive transducer circuit (12) energized when a display member (18) and an elongate member (20) move from a gravity determined quiescent orientation (20A) therebetween to an external perturbation driven active orientation (20B) therebetween. In various embodiments, the members are respectively responsive to air movement and acceleration. In one embodiment, the elongate member carries a first electrical contact (21) to abut a second electrical contact (22) carried by the display member. When the apparatus is to be in use with a motor vehicle, the apparatus is desirable to be powered by the cigarette lighter of the vehicle and a light sensor is added to switch on the apparatus during night time.

8 Claims, 9 Drawing Sheets

TRANSDUCER APPARATUS RESPONSIVE TO EXTERNAL PERTURBATION

RELATED APPLICATIONS

This is a Continuation-in-part of U.S. application Ser. No. 07/999,291 filed Dec. 31, 1992, now U.S. Pat. No. 5,469,132, granted Aug. 14, 1995 and U.S. application Ser. No. 08/405,584 filed Mar. 17, 1995, now U.S. Pat. No. 5,473,307, granted Dec. 5, 1995, which are incorporated herein by reference.

FIELD OF THE INVENTION

The present invention relates to display apparatus for energizing an electrically responsive transducer in response to external perturbations, e.g., air movement and or acceleration, to produce an output comprised of sound and/or light and/or motion and/or heat.

BACKGROUND OF THE INVENTION

Traditional transducer apparatus derives power from a battery source and requires a on/off switch to control the power supplied to the apparatus. The objective of the invention is to develop an automobile display apparatus to derive power from the cigarette lighter and for the power of the display apparatus to be switched on and off according to the ambient light of the vehicle.

SUMMARY OF THE INVENTION

The present invention is directed to the power supply structure of an apparatus producing an electrically generated output, e.g., sound and/or light and/or motion and/or heat. The power supply of the apparatus is derived from battery or connected to the cigarette lighter socket of an automobile. A light sensitive component is installed to switch on or off the apparatus according to the optical signal picked up.

Embodiments of the invention are particularly suited for use, for example, display device in automobiles to produce lighting effects to enhance driving pleasure at night. The apparatus is switch on automatically when the car is in motion and when a predetermined darkness level is detected by the optical sensor. The power of the device is automatically switched off when the car is not in motion or in day time.

Additionally, embodiments of the invention find utility in many other applications, e.g., in wind chime, or refrigerator door display magnet to produce electronically simulated sounds or lighting effects. The decorating device is switched on only when the light sensor picks up qualifying optical signal such as when sufficient day light is detected.

Embodiments of the invention are characterized by a light sensitive component which pick up ambient light signal to control the activation of the apparatus. When the apparatus is for use in an automobile, the power supply is not only desirable to be switched on when low light level is detected but also to be derived from the 12V cigarette lighter socket. An adjustable rigid connecting plug is preferable to support the device and provide room for the electronics.

The novel features of the invention are set forth with particularly in the appended claims. The invention will be best understood from the following description when read in conjunction with the accompanying drawings.

DESCRIPTION OF THE PREFERRED EMBODIMENTS

Figure 1:
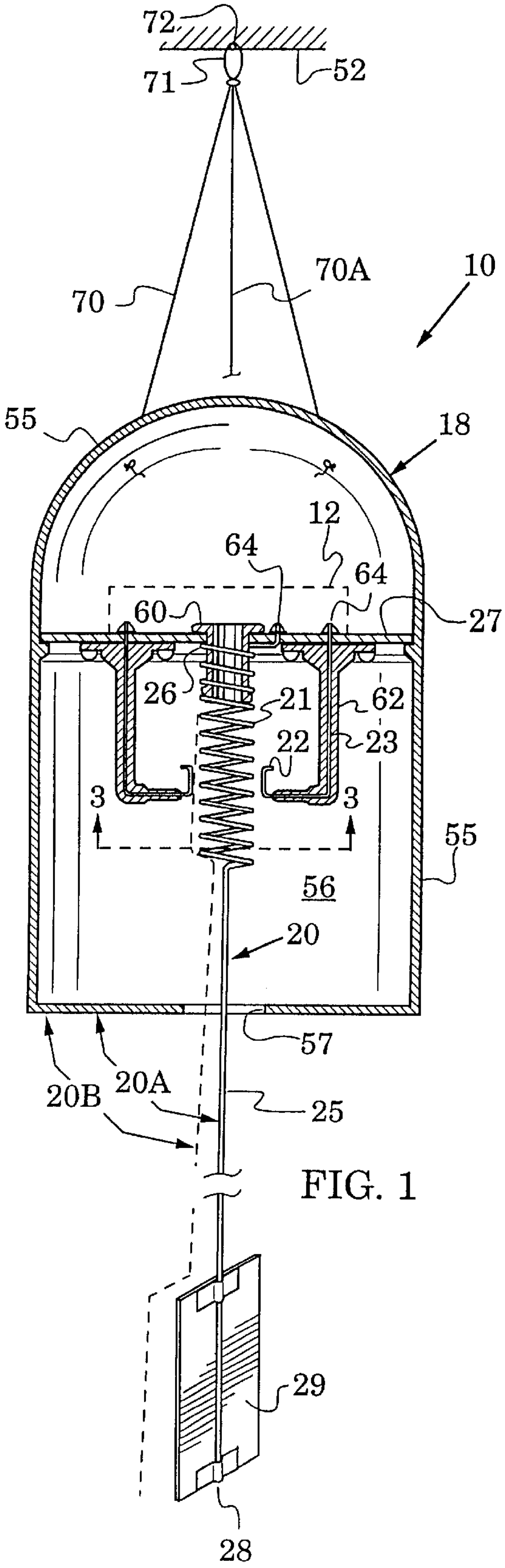
FIG. 1 is a sectional elevation view of a first embodiment of the present invention.

A preferred embodiment 10, in accordance with the present invention, of a transducer apparatus responsive to external perturbation is illustrated in the elevation view of FIG. 1. The apparatus 10 includes an electrically responsive transducer circuit 12 (indicated by broken lines and illustrated in FIG. 8) carried by a display member 18. The transducer circuit 12 is energized by completion of an electrical path when an elongated member 20 swings, relative to the display member 18, from a stable substantially vertical quiescent orientation 20A to an unstable active orientation 20B.

The completion of the electrical path due to the display member 18 and elongated member 20 changing to the activate orientation 20B may be implemented in many different ways. For example, a proximity switch, an energy beam (e.g. visible or infrared light), or electrical contacts can be positioned to sense change between orientations 20A, 20B.

FIG. 1 illustrates an embodiment 10 in which a first electrical contact in the form of a flexible conductive helical member 21 and a second electrical contact in the form of ends of a plurality of conductive wires 23 are caused to engage when the display member and elongate member 20 are in the activate orientation 20B. In this embodiment, the helical member 21 and a descending extender portion 25 thereof are part of the elongate member 20 which is attached at a first end 26 to a mounting member 27 for swingable movement of a second end 28.

In the embodiment 10, the elongate member 20 includes, proximate to its second end 28, an air motion sensitive member in the form of a vane 29. Thus, an external perturbation, e.g., air movement, moves the elongate member 20 to complete an electrical circuit through the first and second electrical contacts 21, 22 to energize the transducer circuit 12.

Figure 2A:
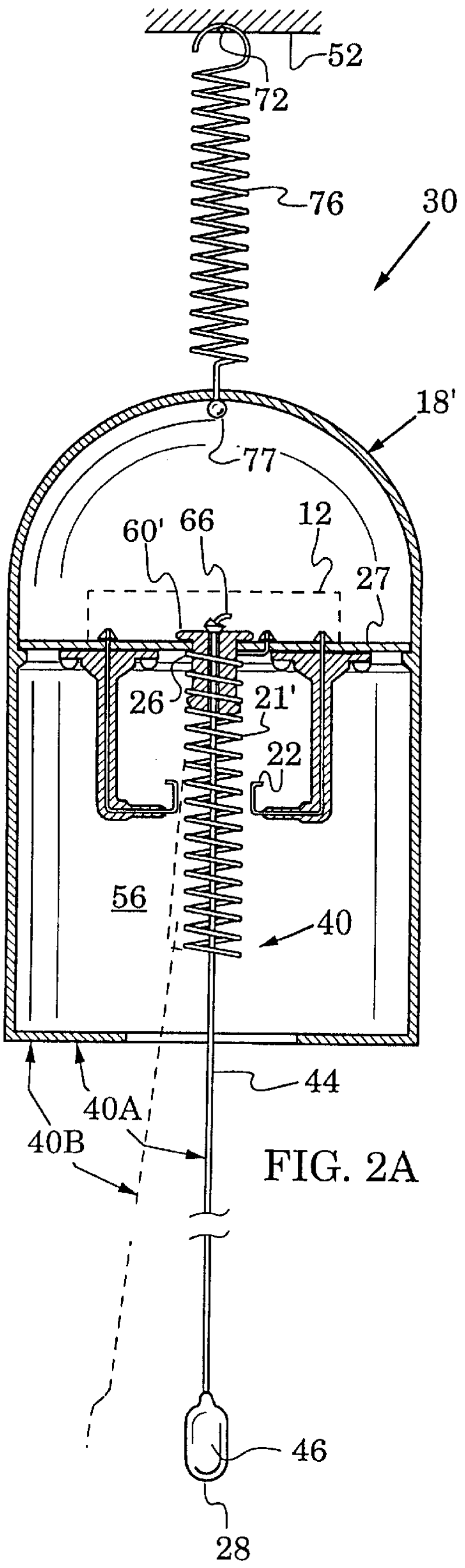
FIG. 2A is a sectional elevation view of another embodiment of the invention.

FIG. 2A is a view similar to FIG. 1 illustrating another preferred embodiment 30. In the embodiment 30, an elongate member 40 has a first electrical contact in the form of a flexible helical member 21', a flexible cord 44 received therethrough and, proximate to its second end 28, an acceleration sensitive member in the form of a weight or bob 46. Thus the external perturbation of acceleration may move the elongate member 40, relative to the display member 18', from a stable quiescent orientation 40A to a unstable active orientation 40B. This completes an electrical circuit through the first and second electrical contacts 21, 22.

Figure 2B:
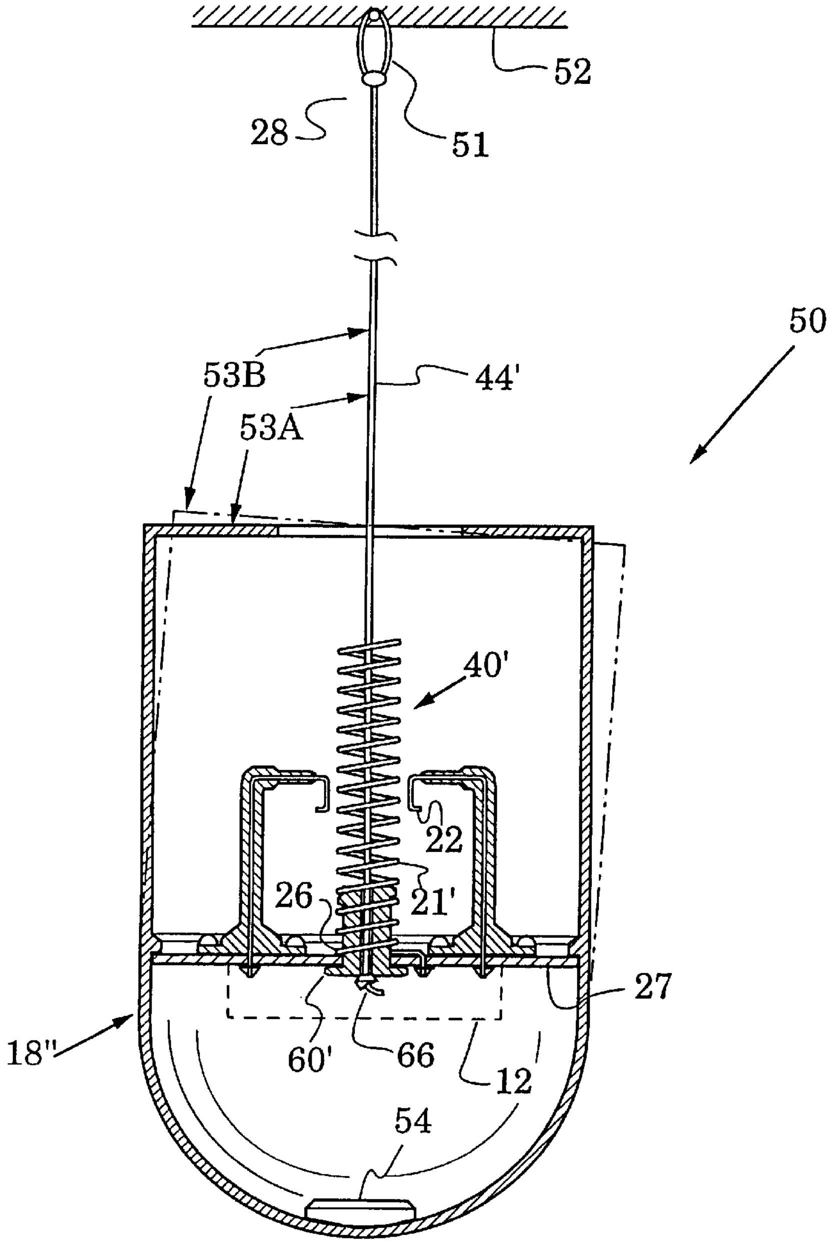
FIG. 2B is a sectional elevation view of another embodiment of the invention.

FIG. 2B illustrates another preferred embodiment 50. In the embodiment 50, an elongate member 40' has a first electrical contact in the form of a flexible helical member 21' and a flexible cord 44' received therethrough. A display member 18" is swingably supported from a first end 26 of the elongate member. The second end 28 of the elongate member 40' is suspended via a ring 51 to an external support 52. Therefore, the external perturbation of acceleration may move the display member 18", relative to the elongate member 40', from a stable quiescent orientation 53A to an unstable activate orientation 53B. The stability of the orientation 53A is maintained by forming the display member with a center of gravity lower than the elongate member first end 26. This may be done, for example, by adding a weight 54 to the lower part of the display member 18".

In apparatus embodiments 10, 30 and 50, the first and second electrical contacts 21, 22 are connected in series via a printed circuit, carried by the mounting member 27, with the electrically responsive transducer circuit 12. In embodiments 10 and 30, the respective display member 18, 18' is suspended from an external support member 52. The wall 55 of the display member 50 defines an internal space 56 and an aperture 57 which is dimensioned to clear the elongate member.

In the embodiment 10, the elongate member 20 has a vane 29 carried by an integral extender 20 and helical member 21. In the embodiments 30 and 50, and the elongate members comprise a helical member responsive to a flexible cord. It should be understood that these elongate member embodiments are exemplary. For example, in other embodiments of the invention an acceleration sensitive member could be combined with an integral extender and helical member while an air motion sensitive member could be combined with a helical member responsive to an elongate element received therethrough. Additionally, it should be understood that stiffer members (e.g. a wire) could be substituted for the cords 44, 44' of the embodiments 30, 50.

The transducer circuit 12 mounted within the display member includes sound and/or light and/or motion and/or heat transducers depending on the particular application. For example, for a wind chime application, the transducer circuit 12 would include a sound transducer or speaker. In a decorative display application, the output transducer could comprise one or more light sources, e.g., light emitting diodes, or a small motor to create various visual effects. In a still further application, the output transducer could comprise a heating element useful, for example, to dispense an aromatic vapor, i.e., perfume. When the light and/or motion transducers are used, at least the upper portion or the wall 55 (in FIG. 1) is preferably formed of a transparent or translucent material (e.g. a polymer) to facilitate observation thereof.

It should be apparent from FIGS. 1, 2A and 2B that the embodiments 10, 30 and 50 are configured so that the respective stable quiscent orientations 20A, 40A and 53A are gravity determined while the respective unstable activated orientations 20B, 40B and 53B are determined by external perturbations. Embodiments of the invention are, therefore, suitable for initiating and presenting a display comprising sound and/or light and/or motion in any environment that provides air motion (e.g, a porch open to the wind, a fan), acceleration of the external support member 52 (e.g. the dashboard of an automobile) or other external perturbation.

Attention is now directed to additional details of FIGS. 1, 2A and 2B. In the embodiments 10, 30 and 50, the helical members 21, 21' are respectively received over insulating spools 60, 60' attached to the mounting member 27. Although the shape of the helical member 21, 21' lend a natural resistance to metal fatigue induced by repeated movement of the elongate members 20, 40 and 40' between the quiescent and active orientations, the members 21, 21' are preferably formed of a soft metal to further enhance such resistance. The spool 60' of FIGS. 2A, 2B defines a central tube to receive cords 44, 44' which are knotted at 66 for retention by the spool 60'.

As shown in FIG. 1, the conductive wires 23 are carried by supports 62 descending from the mounting member 27. The upper ends of the helical member 21 and wires 23 are soldered at 64 to the printed circuit of the mounting member 27. The display member 18 defines an annular ledge 68 to retain the mounting member 27 thereto (the ledge 68 may be locally relieved for installation of the member 27).

In the embodiment 10, a plurality of flexible lines 70 terminating in an attachment member 71 (e.g. a loop, a hook) are externally secured radially to the wall 55 (e.g. knotted on the inner side thereof) for suspending the display member 18 from a projection 72 secured to the supporting member 52 (the line 70A terminates above the upper wall 55 because of the sectional view of FIG. 1). In the embodiment 30, a spring 76 which may enhance the gravity response of the bob 46, replaces the plurality of lines 70 with the aid of a restraining ball 77. In the embodiment 50, a ring 51 is used to suspend the elongate member second end 18 from the external support member 52.

The supporting member 52 can form part of an immovable structure, e.g. a house beam, or alternatively, can comprise part of a movable structure such as an automobile roof The plurality of radially attached lines 70 facilitates vertical alignment of the housing 50 from the supporting member 52.

Figure 3:
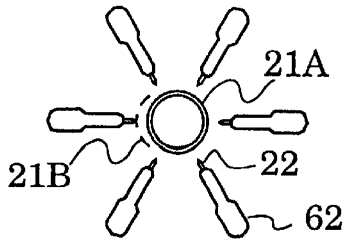
FIG. 3 is a view along the plane 3—3 of FIG. 1.

FIG. 3 is a view along the plane 3—3 of FIG. 1 illustrating how the form of the helical member (first electrical contact) 21 facilitates radial spacing therefrom of the plurality of second electrical contacts 22. When the helical member swings from the quiescent orientation 21 A to the activate orientation 21B it will abut one or more second electrical contacts 22.

Figure 4A:
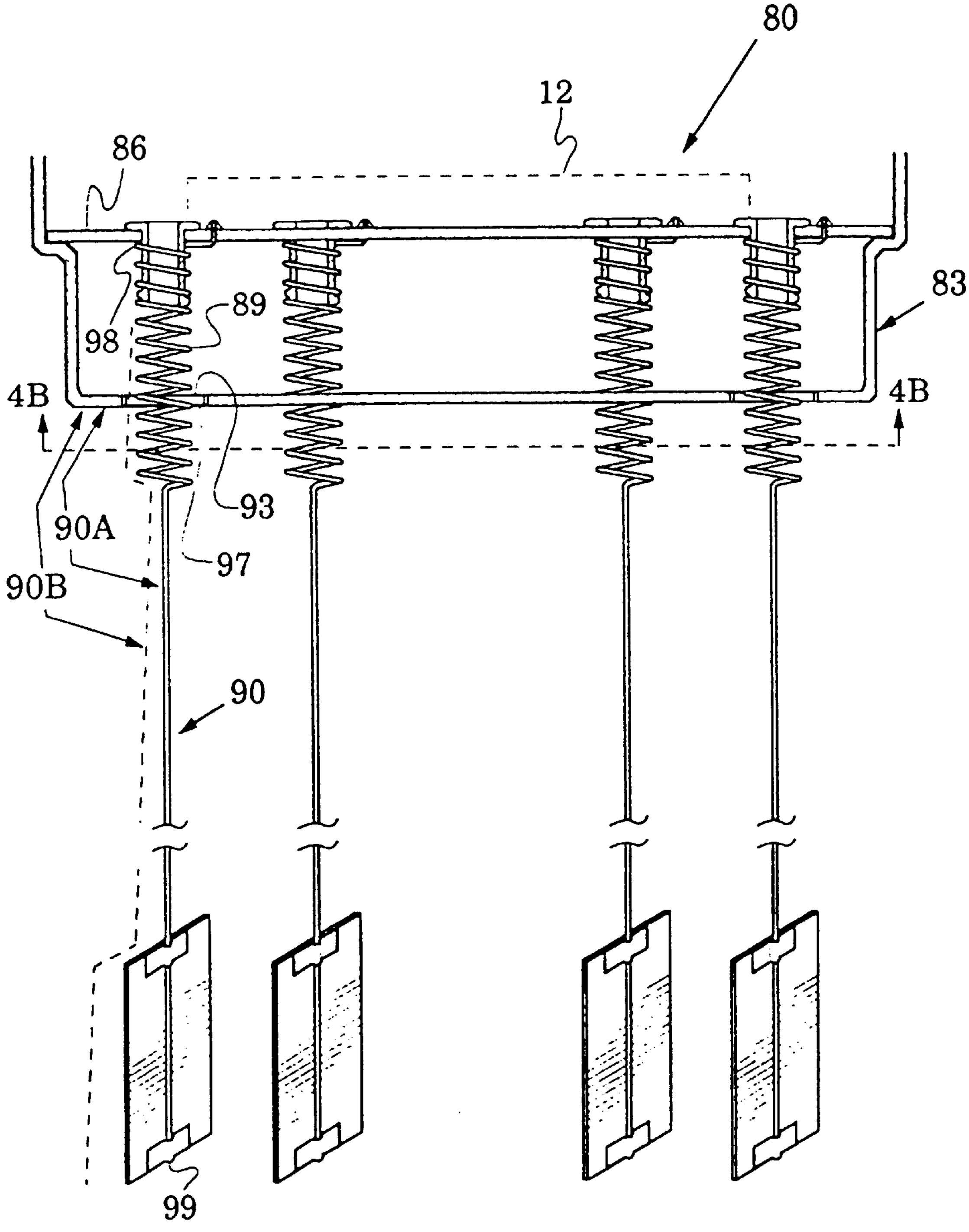
FIGS. 4A and 4B are sectional elevation views of another embodiment of the invention.
Figure 4B:
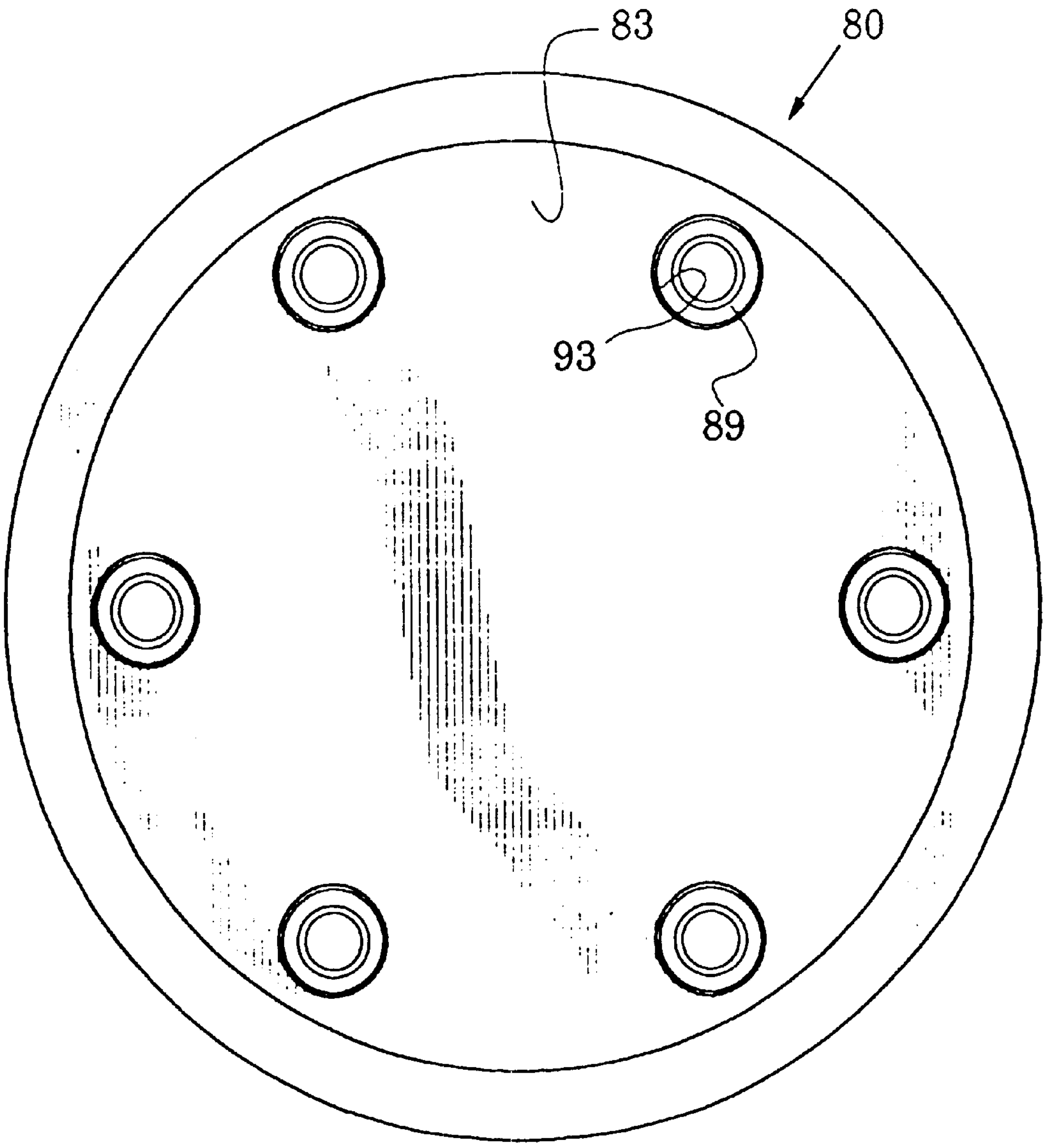

Attention is now directed to FIG. 4A which illustrates another preferred apparatus embodiment 80 having a display member 83 supporting a mounting member 86. In the apparatus 80, a plurality of elongate member 90 (similar to the elongate member 20 shown in FIG. 1) each define a first electrical contact in the form of a helical member 89. A plurality of second electrical connectors in the form of annular rings 93 line openings 97 defined by the display member 83. Each of the elongate members 90 is attached at a first end 98 to the mounting member 86 for swingable movement, relative to the display member 83, of a second end 99 from a substantially vertical gravity determined quiescent orientation 90A to an external perturbation driven activate orientation 90B. This structure is further illustrated in FIG. 4B which is a view along the plane 4B—4B of FIG. 4A.

The embodiment 80 provides structure, therefore, to activate the transducer circuit 12, via any first electrical contact 89 and its associated second contact 93, with a plurality of elongate members 90 each responsive to movement of air. Alternatively, the transducer circuit 12 may comprise a plurality of transducers each activated by a different first and second electrical contact pair.

Figure 5:
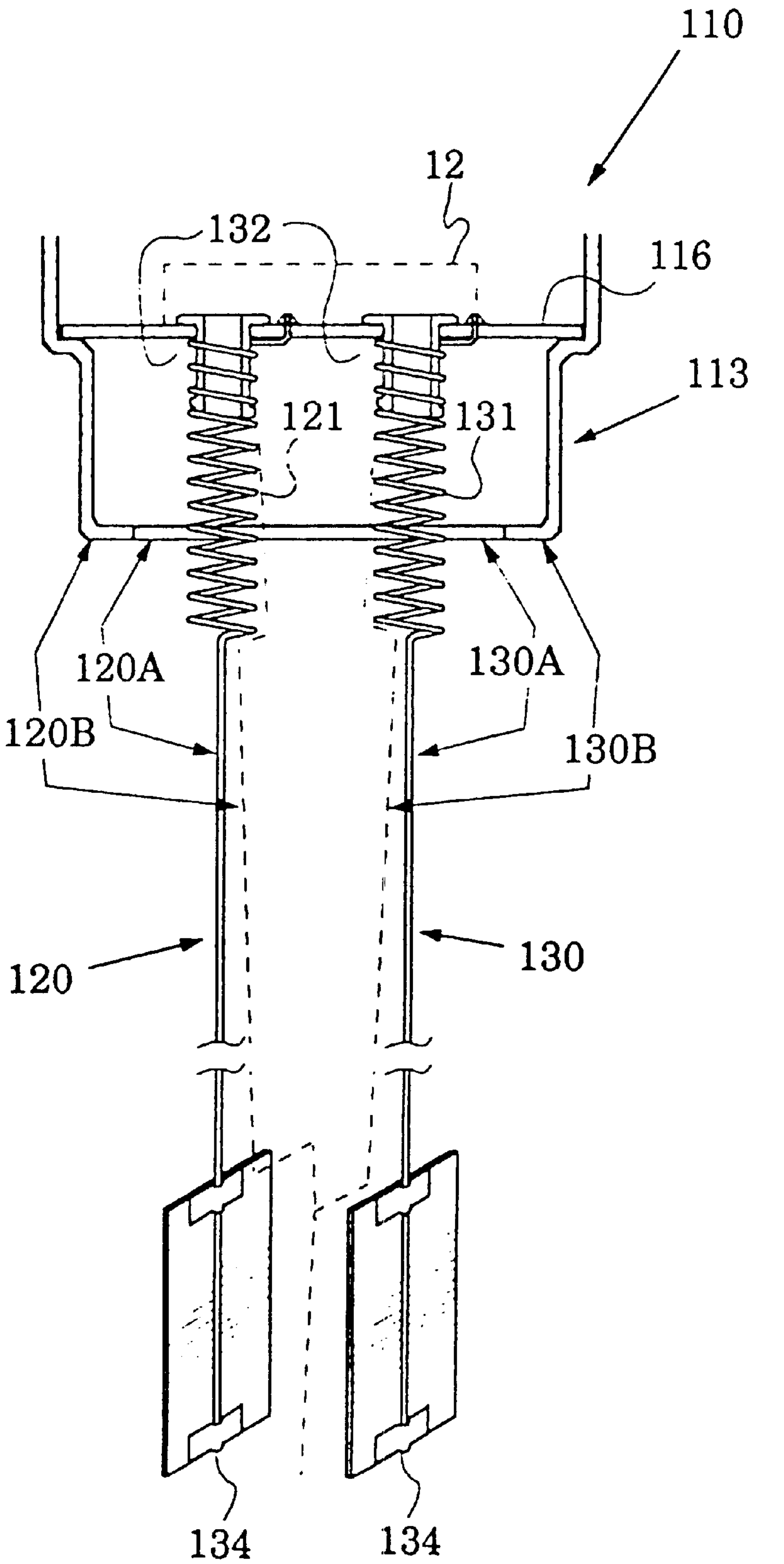
FIG. 5 is a sectional view of another embodiment of the invention.

FIG. 5 illustrates another preferred apparatus embodiment 110 having a display member 113 supporting a mounting member 116. In the apparatus 110, a conductive elongate member 120 (similar to the elongate member 20 shown in FIG. 1) having a helical member 121 forms a first electrical contact. Another elongate member 130 having a helical member 131 forms a second electrical contact. The elongate members 120, 130 are attached at a first end 132 to the mounting member 116 for swingable movement, relative to the display member 113, of a second end 134 from, respectively, quiescent orientations 120A, 130A to external perturbation driven activate orientations 120B, 130B which complete an electrical path through the transducer circuit 12. The embodiment 110 provides structure, therefore, to activate the transducer circuit 12 via contact between first and second electrical contacts formed by elongate members 120, 130.

Figure 6:
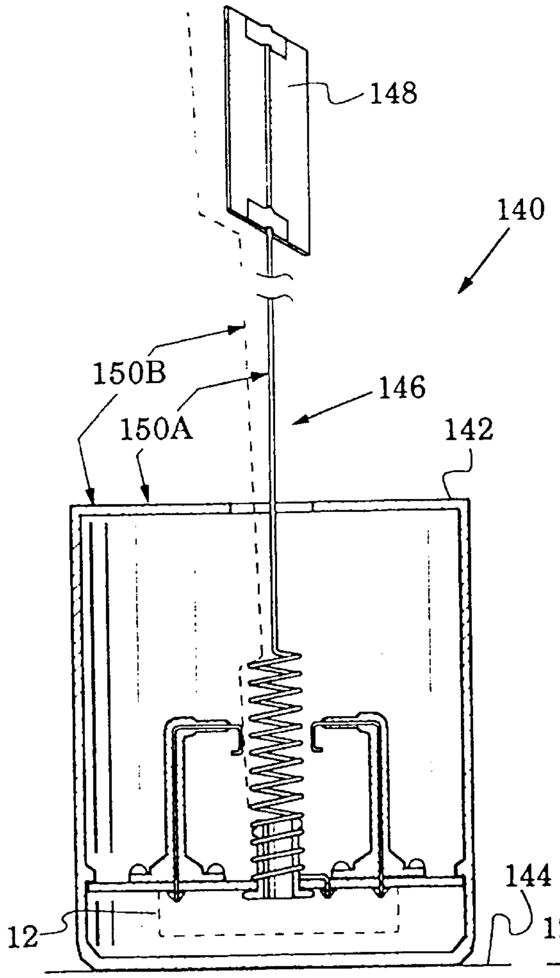
FIG. 6 is a sectional elevation view of another embodiment of the invention.

Another apparatus embodiment 140 is shown in FIG. 6. The embodiment 140 is similar to an inverted form of the embodiment 10 of FIG. 1. The display member 142 is configured to rest on a base 144 and the elongate member 146 includes a vane 148 to respond to air movement so that the relative orientation of the members 142, 146 changes from the quiescent orientation 150A to the activate orientation 150B.

Figure 7:
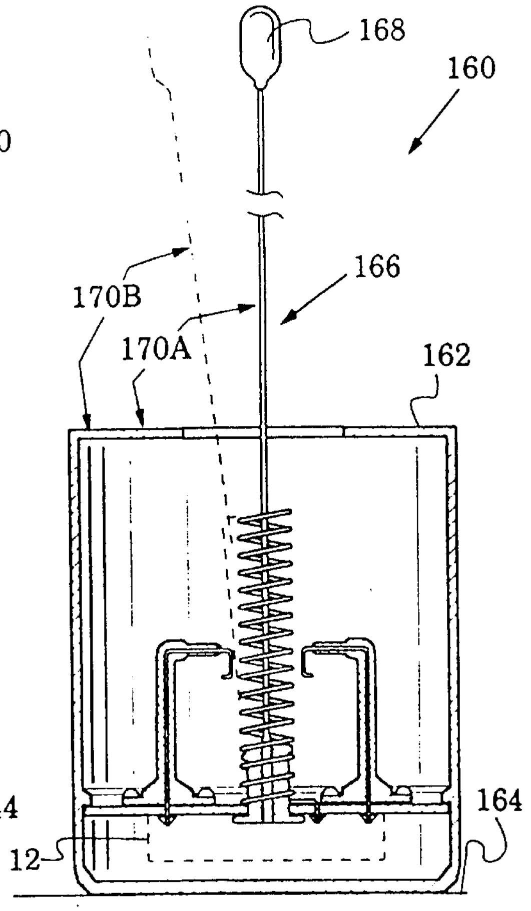
FIG. 7 is a sectional elevation view of another embodiment of the invention.

Another apparatus embodiment 160 is illustrated in FIG. 7 which is similar to an inverted form of the embodiment 30 of FIG. 2. The display member 162 is configured to rest on a base 164 and the elongate member 166 includes a bob 168 to respond to acceleration so that the relative orientation of the members 162, 166 changes from the quiescent orientation 170A to the active orientation 170B.

Whereas the elongate members in the embodiments of FIGS. 1, 2A, 2B, 4A, 4B and 5 could be flaccid, the elongate members of FIGS. 6 and 7 must be sufficiently stiff so as to be free standing. Thus, a suitable elongate member could be formed of a material having appropriate spring characteristics to inherently establish its stable vertical orientation or could be formed of a rigid material which is spring mounted in a manner to establish its stable vertical orientation. It is also pointed out that in both FIGS. 6 and 7, the display members 142 and 162 are preferably secured to the base 144, 164 by a suitable means such as an adhesive or by Velcro.

Figure 8:
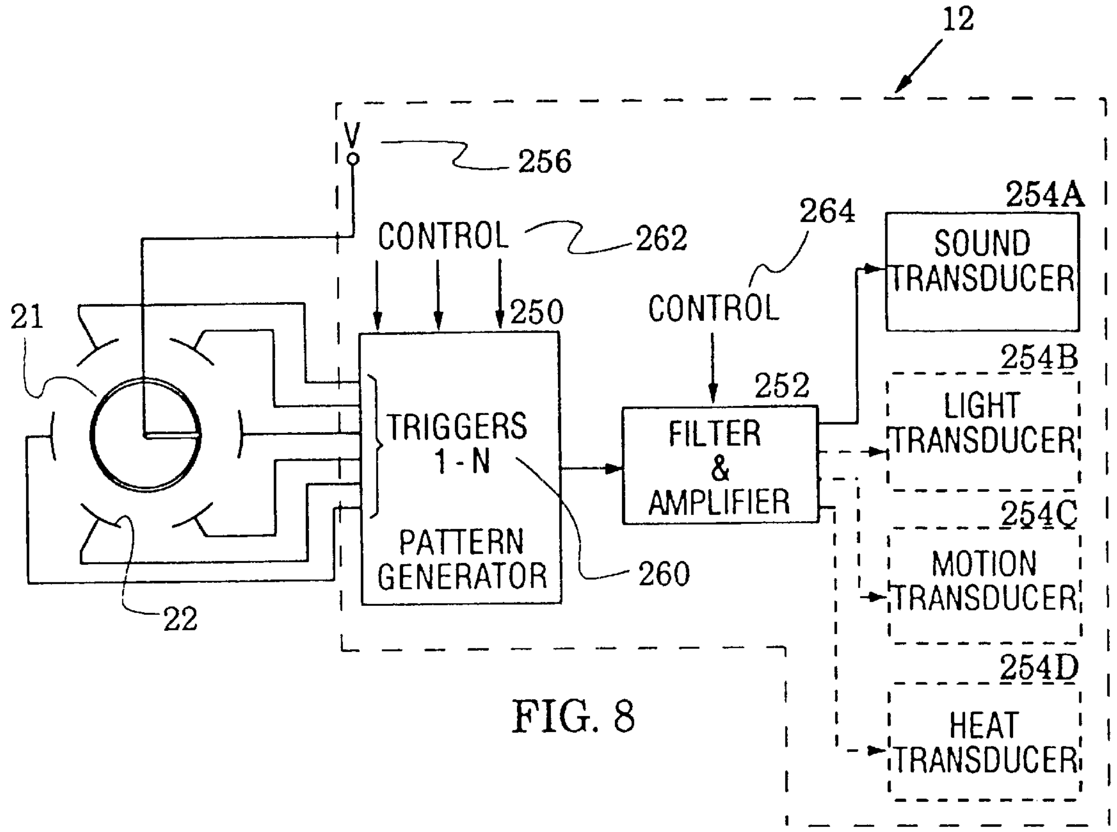
FIG. 8 is a circuit diagram of an embodiment of the invention.

FIG. 8 depicts a circuit diagram of the transducer circuit 12 which includes a pattern generator 250, a filter and amplifier 252 and a sound transducer 254A. Alternatively, the circuit 12 may include a light transducer 254B and/or a motion transducer 254C and/or a heat transducer 254D. The first and second electrical contacts 21, 22 (shown for example in FIG. 1) are connected in series with the transducer circuit 12. When the elongate member and display member are in their activate orientation (e.g. member 18, 20 of FIG. 1) are in their quiescent orientation, the first and second electrical contacts 21, 22 will be spaced from one another as shown in FIG. 8. When they move to the activate orientation, the first and second electrical contacts 21, 22 will move into electrical contact to energize the transducer circuit 12 by completing an electrical circuit through it (e.g. by connecting the voltage supply 256 to the remainder of the circuitry).

Various commercially available pattern generators are known for producing signals for driving the transducers 254 to produce desired outputs. For example, inexpensive semiconductor chips (presently used in greeting cards and toys) can be used as the pattern generator 200. Such chips are readily capable of producing different electrical patterns for driving the transducers 254. Each pattern can be activated when the circuit is completed through a different trigger input 260.

When the sound transducer 254A (e.g. a speaker) is used, the transducer circuit 12 may synthesize and emit various sounds which simulate chimes, wind, ocean waves, etc. These sounds may each be activated, for example, when the circuit is completed through a different one of the second electrical contacts 22. The transducer circuit 12 is preferably provided with various control inputs 262 which enable a user to control, for example, melody, tempo, duration, etc. Similarly, the filter and amplifier 252 is preferably provided with one or more controls 264 for enabling the user to control volume and pitch.

In operation, for example with the apparatus 20 mounted as shown in FIG. 1, an external perturbation will swing the elongate member 20 from the quiescent to the activate orientation to momentarily connect the first and second electrical contacts 21, 22. This momentary contact is sufficient to activate the pattern generator 250 to drive the sound transducer 254A in accordance with information preprogrammed into the pattern generator 250, as modified by the settings of the control 260, 262.

In contrast, for example, to a conventional wind chime apparatus in which the sound output depends upon the magnitude of the collision between elements, embodiments of the present invention can produce a sound output which is selectively related to or independent of the magnitude of the collision. As noted, the sound output depends upon the preprogramming of the pattern generator 250 as well as the controls 262, 264.

In a manner similar to that described above, the alternative light transducer 254B can display patterns of light produced by miniature light sources, the alternative motion transducer 254C can display motion produced by miniature electrical motors and the alternative heat transducer 254D can dispense an aromatic vapor.

The transducers 254, filter and amplifier 252 and pattern generator 250 can all be readily packaged on a small circuit board (e.g. printed circuit board defined by the mounting member 27 in FIG. 2) which can be easily accommodated as indicated within the broken line 12 in FIGS. 1, 2, 4, 5, 6 and 7.

Figure 9:
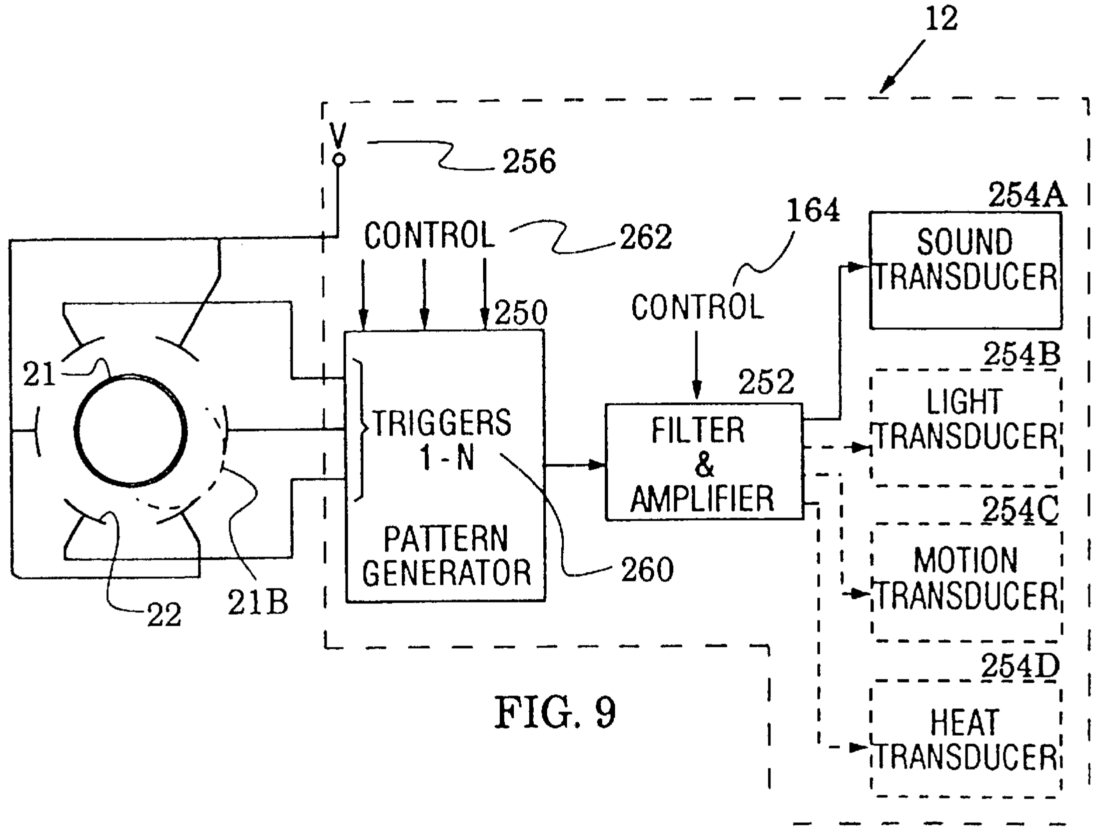
FIG. 9 is a circuit diagram of another embodiment of the invention.

FIG. 9 illustrates an alternate arrangement of the circuit diagram of FIG. 8 in which the circuit is completed by the first electrical contact 21 abutting pairs of second electrical contacts 22 as shown in the activate orientation 21B.

Figure 10:
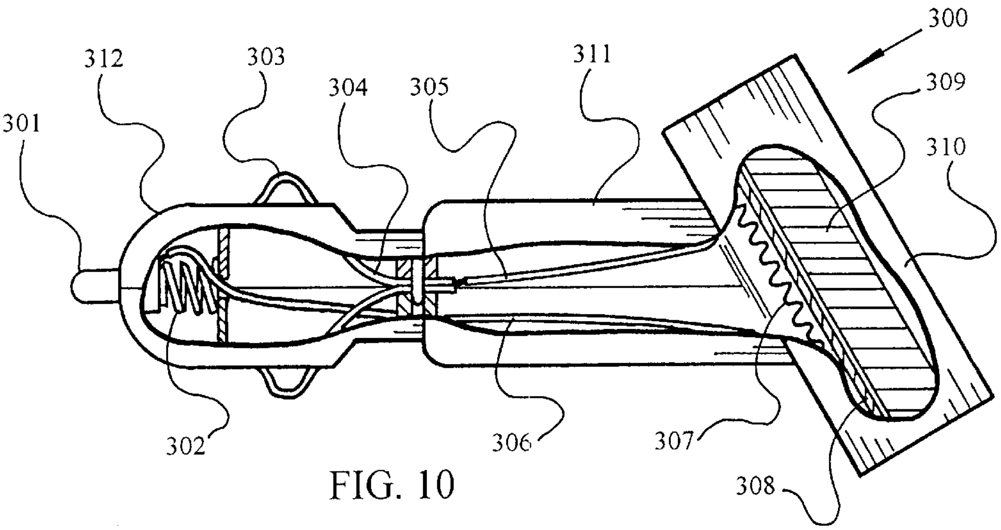
FIG. 10 is a sectional elevation view of another embodiment of the invention.

Attention is now directed to FIG. 10 which illustrates another application. The apparatus embodiment 300 having a display member 310 supported by an elongate supporting member 311. When acceleration of a motor vehicle initiates a motion switch as illustrated by FIG. 7, electrical current passes through the heater element 307 which is represented by 254D of FIG. 8 and FIG. 9. Heat energy generated by the heater element is conducted to the heat sink 308 which in turn warms up the heat sensitive air freshner aromatic material 309. When the apparatus 300 is plugged into a cigarette lighter socket of a motor vehicle, contact members 301 and 303 conduct electrical current to the heater and motion sensor through conductor wires 305, 306. Contact member 301 locates at the end of the terminal end 312 and is supported by the spring 302. Contact member 303 locates proximal by the side of the terminal end 312 and is spring loaded by the elastic portion 304.

Figure 11:
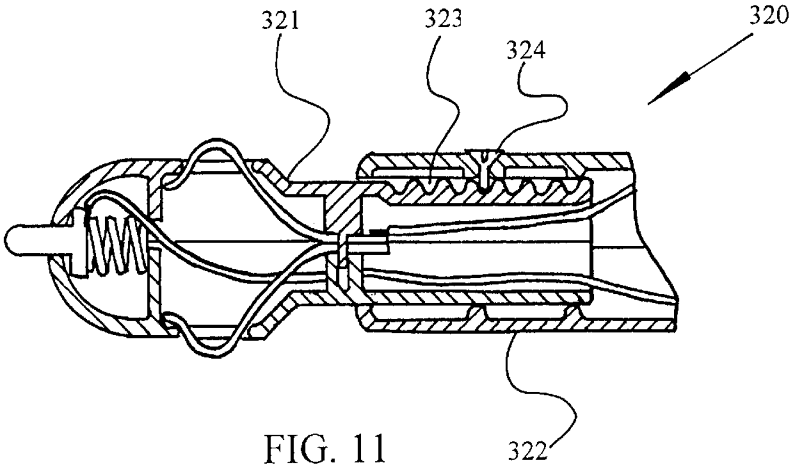
FIG. 11 is a sectional elevation view of another embodiment of the invention.

FIG. 11 is a sectional view of the preferred apparatus embodiment of FIG. 10. The elongate member 311 comprises of two tubular stems 321 and 322. Screw 324 engages into the recess 323 so as to lock the relative positions of the tubular stems 321, 322 when the desirable length of the apparatus is adjusted.

Figure 12:
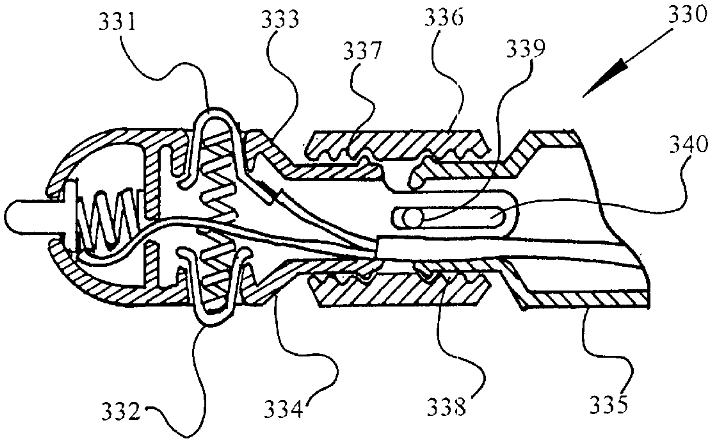
FIG. 12 is a sectional elevation view of another embodiment of the invention.

FIG. 12 is an alternative embodiment to adjust the length of the elongate supporting member. The intermediate mounting bracket 336 connects the two segments of the tubular stems 334, 335. The screw threads 337, 338 of the bracket are arranged in a way such that when the bracket 336 is rotated, the two stems 334 and 335 move in opposite directions. The guide pin 339 extended from the first tubular stem 335 is interconnected with the guiding slot 340 extended from the tubular stem 334 such that the two stems will not rotate with respect to each other.

Figure 13:
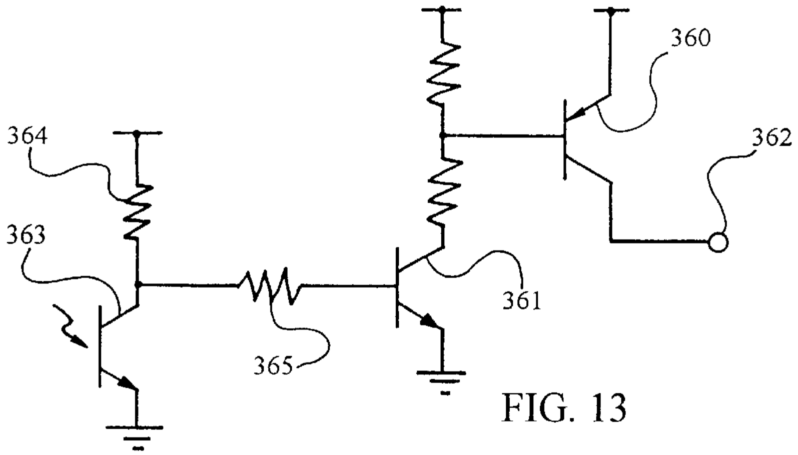
FIG. 13 is a circuit diagram of another embodiment of the invention.

Another application of the invention is a display apparatus in use with motor vehicle to produce lighting effects for the enhancement of driving pleasure at night. Because American cars provide battery power through the cigarette lighter all the time even when the car is turned off, it is desirable for the apparatus to be care free to the users such that the display apparatus turns on automatically only when the car is in motion and during night time. FIG. 13 illustrates circuit means to switch power to the apparatus only when a predetermined darkness level is detected by the light sensitive electrical component 363. In day time, sufficient light current saturates the photo transistor 363 which in turn cuts off the transistors 361, 366. During night time, photo transistor 363 turns off and transistors 361 is turned on by current path along the resistors 364, 365. As a result, transistor 366 is turned on and electrical power is delivered to the terminal 362.

Figure 14:
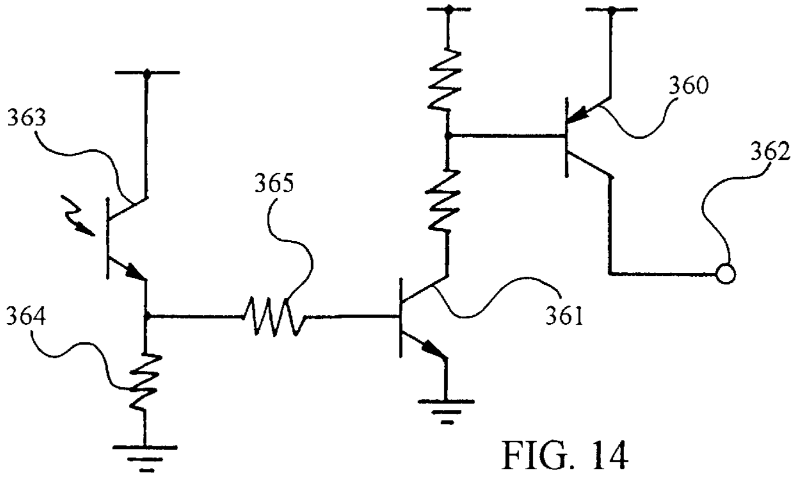
FIG. 14 is a circuit diagram of another embodiment of the invention.

In the application of wind chimes, it is desirable for the electrical power to be automatically turned on only in day time so that the wind chime is kept quiet during night time. An embodiment to achieve this desirable effect is illustrated in FIG. 14. Photo transistor 363 saturated by light current turns on transistors 361, 365 and power is supplied to terminal 362. During night time, transistor 361 is cut off by the resistors 364, 365 and accordingly transistor 366 switches off the power supplied to terminal 362.

Various commercially available light sensitive electrical components are known for achieving the above mentioned desirable light dependent switching effects. For example, inexpensive photo resistor (Cds cells) and photo diodes which are responsive to different light spectrum can be used to design a switching circuit.

Figure 15:
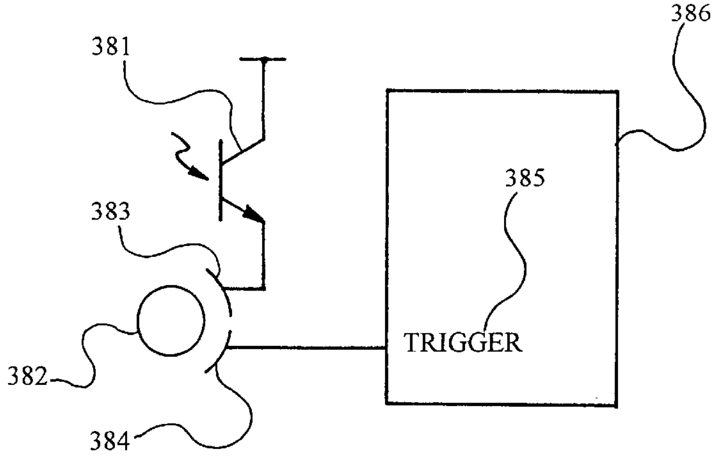
FIG. 15 is a circuit diagram of another embodiment of the invention.

In order to reduce the current loading of the light dependent power switch, the switch output 362 can only be connected to a suitable portion of the circuit means such as the transducer portion or the pattern generator portion to inhibit the apparatus from working. Alternatively, the light sensitive electrical component can be readily interfaced with the control portion of the circuit mean so as to inhibit the circuit means from receiving a trigger signal under the undesirable lighting environment. FIG. 15 illustrate an alternative embodiment to achieve the desirable result. During day time, photo transistor 381 is turned on and the circuit means 386 is triggered when the first electrical contact 382 abutting pairs of second electrical contacts 383, 384. During night time, electrical contact 383 is in high impedance and the circuit means is not triggered even when the electrical contact 383, 384 are conducted by the first electrical contact 382.

When the position of the light sensitive electrical component is properly focused, it can be used for close distance motion detection, e.g. a trigger signal is generated when the light sensor of the apparatus is in motion or the overall light level of the optical image picked up is changed by a close by moving object. It should be understood that a single light sensitive electrical component can be used to detect close by motion and switch off the circuit means by night time.

The combination of a magnetic material such as permanent magnet or plastic molded magnet to the different display embodiments described provides a display magnet which triggers the playback of sound, such as a prerecorded audio message defined by the pattern generator; or various kinds of lighting effects when the refrigerator door is opened or closed.

From the foregoing, it should be appreciated that transducer apparatus embodiments have been disclosed herein energizeable in response to external perturbations such as wind, acceleration or motion.

The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. An apparatus dimensioned to plug into the cigarette lighter socket of a vehicle comprising:

a terminal end including a first electrical contact member;

at least one second electrical contact member locates proximal to said terminal end;

a housing member remote from said terminal end; and a variable length elongate supporting member comprising rotational means extending along an axis originated from said terminal end and mounted from said terminal end to said housing member for rotatably adjusting the distance therebetween.

2. The apparatus of claim 1 further comprising a heat transducer to conduct electrical current from said electrical contact members.

3. The apparatus of claim 1 further comprising a light transducer to conduct electrical current from said electrical contact members.

4. The apparatus of claim 1 wherein the cross sectional area of said variable length elongate supporting member is smaller than the corresponding cross sectional area of said housing member.

5. The apparatus of claim 1 further comprising circuit means to conduct electrical current from said contact member.

6. The apparatus of claim 5 further comprising an electrically responsive transducer to be energized by said circuit means.

7. The apparatus of claim 6 further comprising a light sensitive electrical component for controlling the activation of said transducer.

8. The apparatus of claim 6 further comprising:

a motion sensor including a first sensor member and a second sensor member wherein said circuit means responsive to the relative movement of the first sensor member with respect to the second sensor member, for energizing said transducer.

* * * * *